Oct. 31, 1950      D. W. JORDAN      2,528,058
ION EXCHANGE TREATMENT OF SUGAR SOLUTIONS
Filed July 12, 1949      4 Sheets-Sheet 1

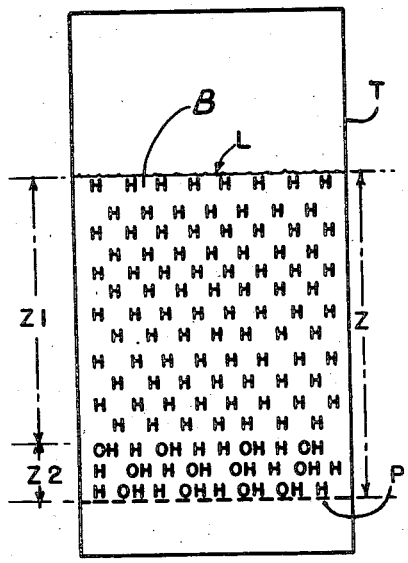

Starting Condition after Exhaustion of the ANION Exchange Bed by SUGAR JUICE:

SUGAR JUICE has passed through the Bed leaving the Bed incompletely Exhausted at the End of the JUICE Run, due to Incomplete Exhaustion at the Bottom Zone of the Bed.

(Residual JUICE has been Washed from the Bed.)

FIG. 1.

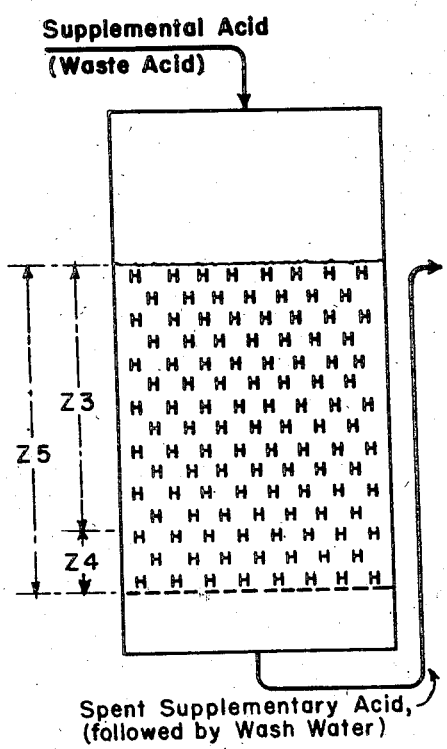

Supplemental Acid (Waste Acid)

Spent Supplementary Acid, (followed by Wash Water)

STEP I.

Supplementary Exhaustion:

Passing through the Bed Supplementary Acid (Waste Acid) to Complete the Exhaustion of the Bed by Exhausting the Bottom Zone thereof, (followed by Washing Residual Acid from the Bed.)

FIG. 2.

INVENTOR:
DAVID W. JORDAN,
BY
Arthur Middleton
ATTORNEY

Oct. 31, 1950     D. W. JORDAN     2,528,058

ION EXCHANGE TREATMENT OF SUGAR SOLUTIONS

Filed July 12, 1949     4 Sheets-Sheet 2

Alkali Regenerant Solution ($NH_4OH$)

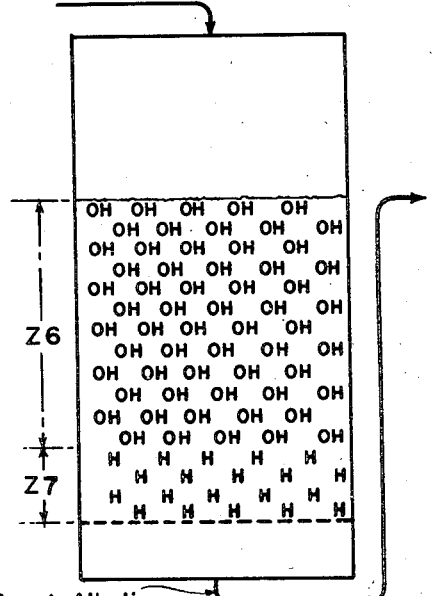

STEP II.
Regeneration:

Passing Regenerant Solution through the Bed to Effect Regeneration leaving the Bed Incompletely Regenerated because of Incomplete Regeneration of the Bottom Zone, (followed by Washing the Alkali from the Bed.)

FIG. 3.

Spent Alkali Regenerant Solution, (followed by Wash Water.)

Acid SUGAR JUICE

Condition of Bed at the Begining of its Exhaustion by SUGAR JUICE.

STEP III.
Exhaustion:

Passing Acid SUGAR JUICE through the Bed until the Bed reaches the degree of Incomplete Exhaustion of Fig. I., (followed by Washing Residual JUICE from the Bed.)

NOTE: The uniform pH thus obtained in the Purified Effluent JUICE from this Bed, is due to Sequential Occurrence in the Bed of the Exchange reactions exemplified by the following equations:

$RX \cdot OH + HCL \rightleftharpoons RX \cdot CL + H_2O$
$RX \cdot OH + NaCL \longrightarrow RX \cdot CL + NaOH$
$RX \cdot HCL + NaOH \longrightarrow RX \cdot OH + NaCL$

INVENTOR:
DAVID W. JORDAN,
BY
ATTORNEY

Purified SUGAR JUICE
Neutralized to a substantially uniform pH

FIG. 4.

Condition of the Bed
at the END of its Exhaustion
by SUGAR JUICE.

Patented Oct. 31, 1950

2,528,058

UNITED STATES PATENT OFFICE 2,528,058

ION EXCHANGE TREATMENT OF SUGAR SOLUTIONS

David W. Jordan, Yonkers, N. Y., assignor to The Dorr Company, Stamford, Conn., a corporation of Delaware Application July 12, 1949, Serial No. 104,224

2 Claims. (Cl. 127—46)

This invention relates to ion exchange treatment of impure sugar-bearing solutions whereby the solution is freed of such impurities as dissolved inorganic salts by being passed sequentially through a bed of cation exchange material and a bed of anion exchange material, with each bed being operated cyclically, namely in that exhaustion of the bed alternates with regeneration thereof. That is, a bed having a certain exchange capacity will have juice passed therethrough until exhausted, and will then have a regenerant solution passed through it until its exchange capacity will have been restored for another run of juice through the bed.

By way of example and in no limiting sense reference will herein be had to the ionic purification treatment of sugar juice derived from sugar beets, where such treatment is applied to the juice prior to its being sent to the evaporators to be concentrated into syrup. Such ionic purification treatment by means of cation and anion exchange materials is also known as de-ionization.

Cation- as well as anion-exchange materials for this purpose are granular and may be of a suitable kind commercially obtainable, for example the granular organic resinous materials now also known as exchange resins or as organolites.

I have observed the sugar juice to emerge from such de-ionization treatment, that is from the anion exchange bed with a varying pH ranging from highly alkaline at the beginning to about neutral at the end of a juice run through the exchange beds.

It is an object of this invention to so conduct or improve the ion exchange operation that the treated juice flowing from the anion exchange bed shows a substantially uniform pH of a desired value, for example about or somewhat above neutral.

In the course of such de-ionization treatment the juice in passing through the cation exchange bed turns acid, but is neutralized subsequently when passing through the bed of anion exchange material which in effect is an acid-adsorbing material. Indeed, I have observed the treated or de-ionized juice to flow from the anion exchange bed first alkaline to the extent of a pH of about 9.0 to 10.0, and the pH to taper off to about neutral (7.0) as the anion exchange bed becomes increasingly exhausted. This lack of uniformity in the pH of the treated juice as it passed from the anion exchange bed and especially its initial high alkalinity are objectionable for at least one reason, namely that with such high alkalinity the juice tends to color up or darken while being concentrated in the evaporators.

Therefore, this invention endeavors to supply to the evaporators directly a de-ionized juice derived from the de-ionization station at a substantially uniform pH of a desired order.

In such a de-ionization process the cation exchange bed following its exhaustion must be regenerated with a suitable acid, for example $H_2SO_4$ or HCl and it therefore operates in what is known as the H-ion exchange cycle. The anion exchange bed must be regenerated with an alkali, for example $NH_4OH$ and it therefore operates in what is known as the hydroxyl-ion cycle. The juice is contacted sequentially with these beds until they will have become substantially exhausted. Then the juice flow through the beds is interrupted, residual juice displaced from them with wash-water, this step being known as sweetening off, and the beds then regenerated by passing through them the respective regenerant solutions. After in turn having displaced the residual regenerant solution with wash-water the beds are again ready for a juice run, that is for the de-ionization of the juice.

By reason of its acid regeneration the freshly regenerated cation exchange bed is substantially saturated with $H^+$-ions, while the freshly alkali-regenerated anion exchange bed is substantially saturated with $OH^-$-ions. When the sugar solution containing dissolved and ionized inorganic salts passes through a regenerated cation exchange bed the cations of the salts exchange for $H^+$-ions from the exchange material so that the juice leaving this bed will have become correspondingly acidified to a pH that may lie in a range of 0.5 to 2.5 depending upon the concentration of the salts in the juice. The flow of juice through the anion exchange bed is continued until the bed will have become substantially exhausted as is indicated by the pH of the juice flowing from the bed.

When the acid juice then flows through a freshly regenerated anion exchange bed, I have observed the juice to emerge first at a relatively high pH of about 9.0 to 10.0 which gradually drops to about neutral as the bed is nearing exhaustion. I interpret and explain this phenomenon as follows: the acid juice passes from the cation exchange bed with a trace of inorganic salt left residual in it. As this juice passes through the alkali-regenerated exchange bed the acid molecule in the juice is adsorbed by the exchange material tending to neutralize the juice. Yet, due to the inherent basicity of the anion exchange material, the trace of residual salts in the juice is converted in the anion exchange bed to the corresponding bases or carbonates, depending upon whether the bed was regenerated with a hydroxide or with a carbonate which accounts for the initial high pH of the otherwise highly purified juice passing from the anion exchange bed. Also minute traces of regenerant alkali may have been left in this bed after regeneration and washing, to contribute to the initial high alkalinity of the purified juice. To illustrate, when a trace of salt, such as NaCl is passed through the anion exchange bed with the otherwise acid juice, the stronger acid radical Cl⁻ would displace the OH⁻ radical from the exchange material and thus give cause to the basic reaction. At any rate, as progressive exhaustion of the bed lowers the basicity of the anion exchange material, the basic reaction of the treated purified juice diminishes as its pH decreases towards neutral.

I attain my object of producing a treated juice flowing from the anion exchange bed at a uniform pH by conditioning or, so to speak, buffering the effluent end portion of the bed with extra H⁺-ions from any suitable source. Thus, while initial alkalinity develops in the juice while in transit downward through the influent portion of the bed, further on down as the juice passes through the effluent portion of the bed, that alkalinity will be neutralized within the bed because the OH⁻-ions which the juice acquired displace the added H⁺-ions from the effluent end portion of the bed. Then as the bed becomes increasingly exhausted simultaneously with the displacement of the H⁺-ions therefrom, the pH of the juice will of its own accord drop towards neutral because of the gradual weakening of the basicity of the exchange material. The quantity of H⁺-ions added for buffering the effluent end portion of the bed may be adjusted in accordance with practical requirements and in such a manner that it suffices to automatically neutralize the initial high alkalinity until such time as the juice of its own accord flows substantially neutral from the bed to the evaporators.

The manner in which I attain this object will be more clearly understood when considering more in detail actual conditions under which the cyclic operation of the anion exchange bed is conducted. After a bed has been freshly regenerated by a downward flow of alkali it may be visualized as having its upper and major portion saturated with OH⁻-ions while its bottom portion still contains acid molecules in terms of H⁺-ions although intermingled with OH⁻-ions. That is to say, under usual operating conditions the bed never becomes completely exhausted with the H⁺-ions. The degree to which the bed is allowed to become exhausted is dictated by practical considerations, which are common knowledge and therefore need not here be discussed. Suffice it to say that under sugar juice treating conditions the bed is allowed to become exhausted to the extent of about 90% of its theoretical exchange capacity.

After washing the residual sugar solution downwardly from an exhausted bed with washwater, this invention proposes to pass downwardly through the bed an auxiliary conditioning solution, namely acid, in a quantity sufficient to positively and completely exhaust the balance of the bottom end portion of the bed by displacing therefrom the residual OH⁻-ions. Following such auxiliary or conditioning treatment the bed may be visualized as substantially uniformly and completely saturated with H⁺-ions from top to bottom. This complete exhaustion of the bed with no intermingled OH⁻-ions in the bottom portion is an important intermediate condition of the bed characteristic of the process according to this invention.

Then follows the regeneration proper by passing an alkali solution downwardly through this fully exhausted bed. Again, since practical reasons dictate that the entire bed ought not to be regenerated, regeneration downwardly is carried on only to a point where an upper major portion or zone of the bed will have had the acid molecules or H⁺-ions replaced with the regenerating OH⁻-ions, while the balance or bottom zone of the bed is allowed to remain saturated or exhausted with H⁺-ions, although both of these zones may be visualized as merging into each other.

After displacing from the bed downwardly residual alkali regenerant solution, the bed is again ready for deacidifying or neutralizing and juice to be passed downwardly therethrough.

As the acid juice coming from the cation exchange bed and containing a trace of residual inorganic salts passes through the bed, the basicity of the upper or OH⁻-saturated portion of the bed will convert some of these salts to bases, namely hydroxides, if the bed was previously regenerated with caustic soda. For example, with a trace of NaCl in the juice, the stronger acid radical Cl⁻ then displaces the OH⁻ radical from the upper portion of the bed giving the juice the aforementioned alkaline reaction within the bed.

However, as this alkaline juice reaches and passes through the lower H⁺-saturated zone of the bed there takes place an additional corrective reaction in as far as the OH⁻-ions in the alkaline juice displace H⁺-ions from the bed. That is to say, the juice while in transit through the bed turns temporarily alkaline in an upper zone, but is correctively neutralized in a lower zone of the bed and before it exits therefrom. The net result is that there is obtained an effluent juice from the bed that is substantially neutral instead of being unduly alkaline.

Indeed, the corrective neutralizing action of a bed conditioned according to this invention is rendered at the beginning of the juice run through the bed. As the exhaustion of the bed proceeds its basicity diminishes and so does therefore the alkalinity of the juice. Simultaneously with this exhaustion the supply of corrective H⁺-ions from the bottom zone also becomes gradually exhausted, namely at the rate at which H⁺-ions are being displaced by the OH⁺-ions. In this way the bed can be operated in such a manner that the corrective neutralizing effect within the bed takes place automatically since the degree of conditioning of the bed required to attain that end can be correctly repeated or duplicated over and over again with each operating cycle. Hence, this represents a positive method of producing a desired uniform effluent pH at about neutrality, since it is possible to control the degree of exhaustion of the bed by the juice with sufficient accuracy based upon pH indications of the treated juice flowing from the bed.

According to one feature the supplementary exhaustion of the anion exchange bed is effected by utilizing an unspent portion of regenerant acid contained in the otherwise spent regenerant liquor passing from the cation exchange bed during regeneration thereof. In this way the invention utilizes acid that might otherwise go to waste, and is therefore herein termed waste acid.

Other features and advantages will appear as this specification proceeds.

In the drawings:

Fig. 1 shows the anion exchange bed in its incompletely exhausted condition representing the starting condition for the purpose of this cycle.

Fig. 2 shows the condition of the bed after supplementary exhaustion with acid.

Fig. 3 shows the condition of the bed after incomplete regeneration with an alkali.

Fig. 4 shows the condition of the bed after incomplete exhaustion by sugar juice, resembling the Fig. 1 condition.

Figure 5:
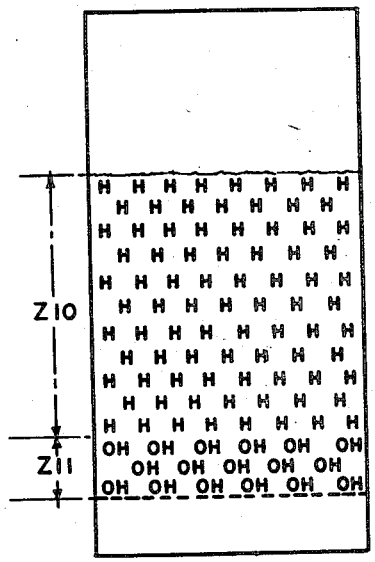
Fig. 5 shows comparative graphs of the pH of the purified sugar juice obtained as the bed changes from the Fig. 3 condition to the Fig. 4 condition.

A description of the operating cycle to which the bed of anion exchange material is to be subjected according to this invention may start with the exhausted condition of the bed as represented in Fig. 1 of the drawings, all flows of liquids through the bed being assumed to be in downward direction.

A bed A of the material is supported upon a perforated plate called a constriction plate P in a tank T, the depth of the bed being indicated as D. Such beds are usually kept submerged in whatever liquid is passing through them, and the top level of the bed as well as the level of the liquid are here assumed to coincide at the level L.

The exhausted condition of the bed B according to Fig. 1 is the result of acid sugar juice from a cation exchange bed having passed downwardly therethrough, leaving an upper and major zone $Z_1$ predominantly saturated with $H^+$-ions from the juice in exchange for OH-ions, and a minor bottom zone $Z_2$ predominantly saturated with OH-ions. In other words, the bed is incompletely exhausted to a degree indicated by the OH-ions left in the bottom zone. The term "predominantly saturated" is herein understood to mean that the H-ion zone $Z_1$ also contains a sprinkling of OH-ions while the OH-ion zone $Z_2$ also contains a sprinkling of H-ions due to the transition of one zone into the other. This condition of the bed is illustrated by H-ion symbols filling the zone $Z_1$ and OH-ion symbols filling the zone $Z_2$. In its Fig. 1 condition the bed is also assumed to have been washed free of residual sugar juice.

Then follows Step I of the operating cycle as represented in Fig. 2, in which any suitable supplemental acid in aqueous solution is passed downwardly through the bed B, for example waste acid obtained from the regeneration of a cation exchange bed. Therefore, waste acid in this embodiment is understood to mean spent regenerant solution containing a portion of unspent acid. A sufficient quantity of such supplemental acid is passed through the bed to replace the OH-ions from the bottom zone $Z_2$ with H-ions, so that complete exhaustion of the bed results as is indicated in Fig. 2 by H-ions filling an upper zone $Z_3$ which is substantially identical in depth with zone $Z_1$ of Fig. 1, and H-ions also filling a bottom zone $Z_4$ which is substantially identical in depth with zone $Z_2$ of Fig. 1. Indeed the total depth $Z_5$ of the bed is now filled with H-ions. Due to the supplemental exhaustion of the bottom zone $Z_4$ that zone may now be considered as being buffered with H-ions for purposes presently to be set forth.

The Fig. 2 condition also represents the bed as having had washed downwardly from it any residual supplemental acid.

Then follows regeneration proper of the bed in accordance with Step II in Fig. 3, namely with a suitable alkali such as $NH_4OH$ in a solution of suitable strength. Such a regenerant solution is passed downwardly through the bed until a major upper zone $Z_6$ thereof will have become regenerated or saturated with OH-ions displacing the H-ions. This leaves a bottom zone $Z_7$ unregenerated, namely saturated with the buffering H-ions corresponding to zone $Z_4$ in Fig. 2. The zone $Z_4$ or $Z_7$ is herein also termed the buffer zone.

The Fig. 3 condition also represents the bed as having had washed downwardly from it any residual supplemental acid.

The bed is now ready for another juice run. Hence in Fig. 4 the condition of the bed at the beginning of Step III is shown to be the same as that of Fig. 3, although acid juice is shown to start flowing into the bed. Even though this juice has already passed through a cation exchange bed in which it has exchanged cations for H-ions, the juice nevertheless still contains a trace of salts originally present in the juice and which may be exemplified as NaCl.

As the juice contacts freshly regenerated anion exchange material, the acids in the juice, for example HCl will be adsorbed by the anion exchange material according to the equation:

(1)     $RX \cdot OH + HCl \rightleftarrows RX \cdot Cl + H_2O$ 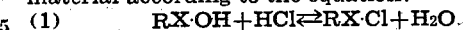
which tends to neutralize the juice.

At the same time the freshly regenerated anion exchange material reacts with the trace of salt (NaCl) in the juice according to the equation:

(2)     $RX \cdot OH + NaCl \rightarrow RX \cdot Cl + NaOH$ 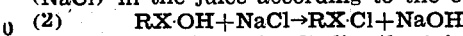
which in turn tends to alkalize the juice to a pH well above neutral.

However, when operating according to this invention this alkalization of the juice is only temporary and occurs only while the juice is in transit through the bed. That is to say, this alkalinity is neutralized to a lower pH even before the juice leaves the bed, merely while passing through the buffer zone $Z_7$ where NaOH previously produced according to Equation 2 reacts with the exchange material according to the following equation:

(3)     $RX \cdot HCl + NaOH \rightarrow RX \cdot OH + NaCl$ 

In this way there is substituted for the NaOH the molar equivalent of a substantially neutral salt the effect of which upon the degree of purity of the juice is negligible. That is to say, a highly purified and yet neutral juice passes from the bed in contrast to a juice of equal purity but high alkalinity that would flow from a bed not thus buffered.

The exhaustion of the bed proceeds from its Fig. 4 condition to a condition shown in Fig. 5 where the OH-ions of the major upper zone $Z_8$ of Fig. 4 have now been replaced with H-ions constituting a zone $Z_{10}$ while the H-ions of the bottom zone $Z_9$ of Fig. 3 have now been replaced with OH-ions to constitute a zone $Z_{11}$.

A substantially uniform pH of the desired order is automatically maintained in the purified juice flowing from the bed by the proper amount of buffering as represented by the depth of the buffer zone relative to the depth of the superjacent regenerated zone. The proportion of the depths of these zones is controllable by the extent to which the bed in its Fig. 2 condition is allowed to be regenerated.

For example, considering the Fig. 3 condition, if a greater amount of buffering in terms of H-ions in the bottom zone is desired or needed in the bed, less regeneration is allowed to take place so as to deepen the zone $Z_7$ at the expense of the zone $Z_6$. Again, if less buffering is required, more regeneration is allowed to take place, so that the zone $Z_6$ may be deepened at the expense of zone $Z_7$.

In this way, by adjusting the amount of buffering in the bottom zone of the bed a substantially uniform pH of a desired order and preferably at or about neutral is attainable according to this invention.

Figure 6:
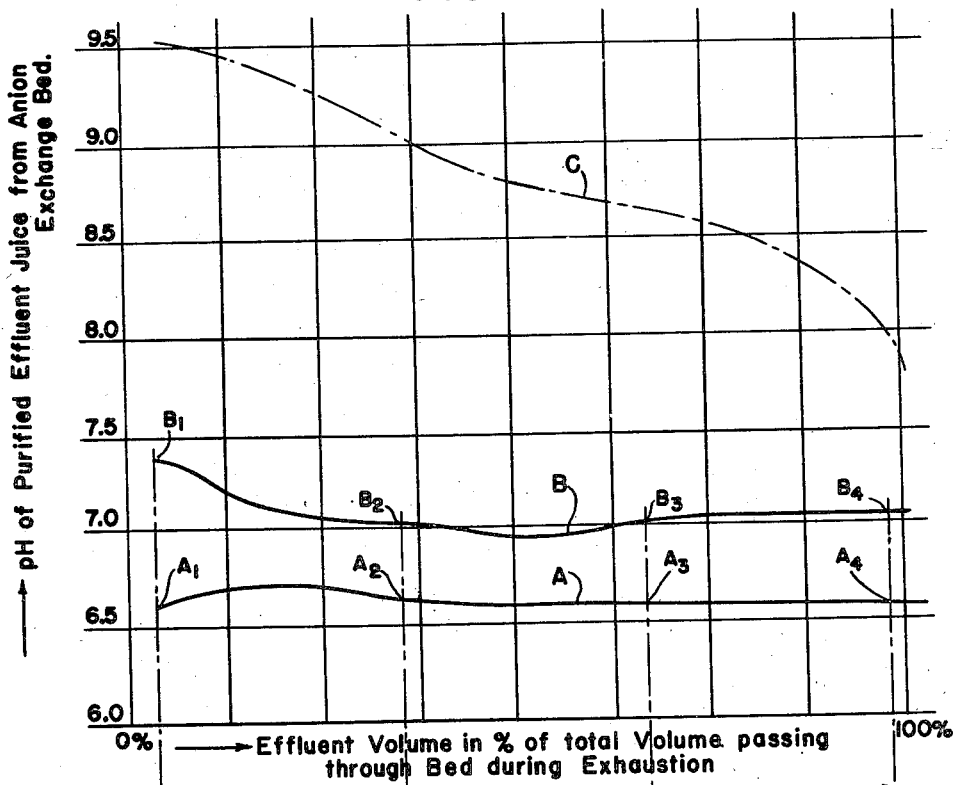
Fig. 6 shows tentative intermediate conditions of the bed as coordinated to certain points along the graphs.

In the chart of Fig. 6 the curves A and B have been plotted by me and represent the result of operating an anion exchange bed in the manner according to this invention.

The curve A is the result of a relatively greater amount of buffering of the bed in terms of the pH attained in the effluent juice for the duration of a practical exhaustion period, the average pH value of which curve lies at about 6.7. By comparison a curve B spaced upwardly from curve A represents the pH which has resulted from a lesser amount of buffering, the pH of that curve showing an average value of about 7.1. The pH values of these curves will herein also be termed the compensated pH values in distinction from pH values which occur in the effluent juice from a bed in which the aforementioned alkalinity has not been compensated in the manner according to this invention.

Such non-compensated pH values for an equivalent juice run through the bed are represented comparatively by the dot-and-dash line curve C which shows an initial value of higher than 9.5 and a terminal value of about 7.8 with an average at about 8.7. Notable in this Fig. 6 chart is the steep slope of curve C as compared with the substantially horizontal character of the curves A and B.

The generally horizontal trend of the compensated pH curves A and B is explained by the fact that the conditioning or buffering of the bed has a self-regulating effect in that the alkalizing effect upon the juice weakens as the exhaustion of the bed proceeds so that proportionately less buffering compensation is needed at the rate at which the potency of the buffering zone diminishes.

In the Fig. 6 chart the ordinate shows the pH of the purified effluent juice from the anion exchange bed, as a function of the effluent volume in per cent of the total volume N passing through the bed during a period of exhaustion, that volume being represented by the abscissa.

Figure 7:
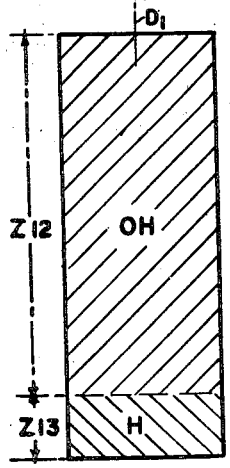
Figs. 7, 8, 9 and 10 represent diagrammatically the conditions of the bed corresponding to curve A of Figure 6.

Taking for example the curve B, the starting point $B_1$ thereof corresponding to the Fig. 4 freshly regenerated condition of the bed is also represented in the bed diagrammatically shown in Fig. 7 and co-ordinated to point $B_1$ as by the dot-and-dash center line $D_1$. The end point $B_4$ corresponds to the Fig. 5 exhausted condition of the bed, which condition is also represented in the bed diagrammatically shown in Fig. 10 and coordinated to point $B_4$ as by the dot-and-dash line $D_4$ of the bed.

Figure 10:
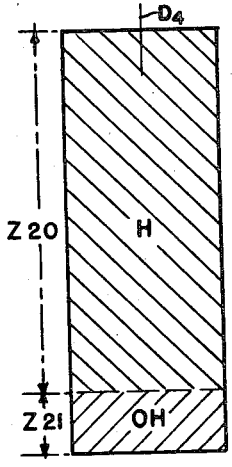

Thus the Fig. 7 bed shows a large upper OH-saturated zone $Z_{12}$ and subjacent thereto an H-saturated smaller buffer zone $Z_{13}$ at the bottom, whereas conversely Fig. 10 shows a large upper zone $Z_{20}$ H-saturated while a bottom zone $Z_{21}$ is OH-saturated indicating that the buffering H-ions have been displaced by OH-ions.

Figure 8:
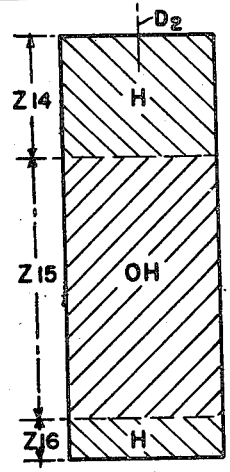
Figure 9:
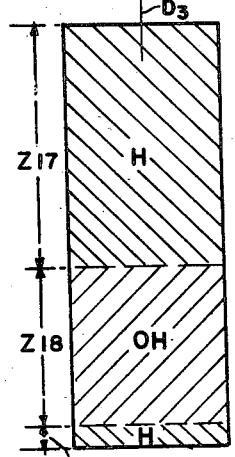

Intermediate although sequential stages of exhaustion of the bed are shown by the Fig. 8 and 9 conditions of the bed, which conditions correspond and are coordinated to respective points $B_2$ and $B_3$ of curve B as by respective dot-and-dash center lines $D_3$ and $D_4$ of the beds of Figs. 8 and 9.

In Fig. 8 the bed is shown partly exhausted, namely to the extent that an upper zone $Z_{14}$ is now saturated with H-ions. This leaves an OH-saturated zone $Z_{15}$ smaller than the OH-zone $Z_{12}$ of Fig. 7, and an H-saturated buffer zone $Z_{16}$ smaller than the zone $Z_{13}$ of Fig. 7, indicating that a portion of the buffering H-ions originally present have been displaced by OH-ions.

In Fig. 9 the bed is shown further exhausted, namely to an extent that an upper zone $Z_{17}$ larger than the zone $Z_{14}$ of Fig. 8 is now saturated with H-ions, leaving an OH-saturated intermediate zone $Z_{18}$ smaller than the zone $Z_{15}$ of Fig. 8, and an H-saturated buffer zone $Z_{19}$ smaller than the zone $Z_{16}$ of Fig. 8, indicating that a further portion of the buffering H-ions have been displaced by OH-ions.

Correspondingly, if the conditions of curve A were to be represented diagrammatically in terms of conditions of the bed, that is corresponding to Figs. 7, 8, 9, and 10, they would have available a relatively deeper buffering zone at the bottom, which would lower average pH of the purified effluent juice below that represented by curve B.

What I claim is:

1. The method of purifying a sugar-bearing solution to remove therefrom non-sugar solutes such as inorganic salts by passing the solution sequentially through an acid regenerated bed of cation exchange material and an alkali regenerated bed of anion exchange material, characterized by passing sugar solution having been rendered acid by cation exchange through a bed of anion exchange material to a point of incomplete exhaustion thereof, washing residual sugar solution from the bed to leave the influent zone representing a major portion of the bed exhausted with $H^+$-ions and the complementary zone of the bed including the effluent end thereof containing a significant quantity of alkalizing $OH^-$-ions formed due to contact of traces of residual non-sugar solutes in the juice with alkali-regenerated anion exchange material, passing auxiliary acid solution through the bed in the direction in which the acid sugar solution has passed therethrough until said $OH^-$-ions in the complementary zone will have become replaced with $H^+$-ions, washing the bed free of said auxiliary solution to leave the bed substantially entirely exhausted with $H^+$-ions, passing through the bed alkali regenerant solution in the direction in which said acid sugar solution and said auxiliary acid solution have passed therethrough until all of the bed except said complementary zone will have become alkali regenerated, washing said influent zone free of residual regenerant solution to leave the bed alkali-regenerated while leaving said complementary zone buffered with $H^+$-ions, and again passing through the bed sugar solution rendered acid by cation exchange to allow alkalizing $OH^-$-ions formed in the sugar solution due to contact of traces of residual dissolved non-sugar in the juice with alkali-regenerated anion exchange material to displace buffering $H^+$-ions from said complementary zone into the sugar solution passing therefrom, whereby the bed is left with said influent zone exhausted by H+-ions and said complementary zone is left regenerated with OH--ions, the proportioning of the depths of the respective zones relative to each other being so chosen that there results a purified sugar solution passing from the bed at a pH of a desired and substantially uniform value.

2. The method according to claim 1, in which said supplementary acid solution comprises spent acid regenerant solution containing a quantity of unspent acid derived from the regeneration of a bed of cation exchange material.

DAVID W. JORDAN.

REFERENCES CITED

The following references are of record in the file of this patent:

UNITED STATES PATENTS

| Number | Name | Date |
|---|---|---|
| 2,301,669 | Richter | Nov. 10, 1942 |
| 2,404,367 | Durant | July 23, 1946 |
| 2,451,272 | Blann | Oct. 12, 1948 |

FOREIGN PATENTS

| Number | Country | Date |
|---|---|---|
| 474,978 | Great Britain | Nov. 2, 1937 |
| 876,930 | France | Aug. 24, 1942 |